United States Patent
Báder et al.

(10) Patent No.: US 11,949,563 B2
(45) Date of Patent: Apr. 2, 2024

(54) TECHNIQUE FOR SELECTING A TRANSPORT CONFIGURATION FOR A DATA NETWORK

(71) Applicant: Telefonaktiebolaget LM Ericsson (publ), Stockholm (SE)

(72) Inventors: Attila Báder, Paty (HU); László Kovács, Martonvásár (HU); Gábor Magyar, Dunaharaszti (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 345 days.

(21) Appl. No.: 17/292,537

(22) PCT Filed: Nov. 12, 2018

(86) PCT No.: PCT/EP2018/080960
§ 371 (c)(1),
(2) Date: May 10, 2021

(87) PCT Pub. No.: WO2020/098908
PCT Pub. Date: May 22, 2020

(65) Prior Publication Data
US 2021/0399952 A1    Dec. 23, 2021

(51) Int. Cl.
*H04L 41/0896* (2022.01)
*H04L 41/147* (2022.01)
*H04L 43/0876* (2022.01)

(52) U.S. Cl.
CPC ........ *H04L 41/0896* (2013.01); *H04L 41/147* (2013.01); *H04L 43/0876* (2013.01)

(58) Field of Classification Search
CPC ............... H04L 41/0896; H04L 41/147; H04L 43/0876
See application file for complete search history.

(56) References Cited

U.S. PATENT DOCUMENTS 7,808,913 B2 * 10/2010 Ansari .................... H04L 47/83
370/458
8,031,599 B2 * 10/2011 Duffield ................ H04L 41/142
370/230.1

(Continued)

FOREIGN PATENT DOCUMENTS

JP        H06276193 A  *  9/1994

OTHER PUBLICATIONS

International Search Report and Written Opinion dated Aug. 20, 2019 for International Application No. PCT/EP2018/080960 filed Nov. 12, 2018, consisting of 7-pages.

(Continued)

*Primary Examiner* — Mohammad S Adhami
*Assistant Examiner* — Jesse P. Samluk
(74) *Attorney, Agent, or Firm* — Christopher & Weisberg, P.A.

(57) ABSTRACT

Selecting a transport configuration for a data network adapted to transport data traffic belonging to different traffic types. A selecting device determines an actual traffic mix of traffic types and corresponding traffic loads transported on the data network. The device determines, based on the actual traffic mix, multiple future traffic mixes of traffic types and corresponding traffic loads, wherein the future traffic mixes are associated with probability values and classifiable into different future traffic mix classes, each future traffic mix class being associated with a predefined transport configuration capable of handling any future traffic mix falling in that future traffic mix class. The device is configured to aggregate the probability values associated with those future traffic mixes that belong to the same future traffic mix class and to select the transport configuration associated with the highest probability value across the aggregated and non-aggregated probability values.

18 Claims, 10 Drawing Sheets

(56) References Cited

U.S. PATENT DOCUMENTS

| | | | |
|---|---|---|---|
| 8,037,163 | B1 | 10/2011 | Lo et al. |
| 2006/0268704 | A1 | 11/2006 | Ansari et al. |
| 2007/0242625 | A1* | 10/2007 | Dunne ................. H04J 14/021 370/258 |
| 2008/0259852 | A1 | 10/2008 | Massiera et al. |
| 2010/0302943 | A1 | 12/2010 | Rawlins et al. |
| 2012/0087377 | A1* | 4/2012 | Lai ......................... H04L 45/04 370/427 |
| 2020/0112590 | A1* | 4/2020 | Bhatia ...................... G06N 3/08 |
| 2020/0269026 | A1* | 8/2020 | Maaskamp ........... A61M 31/00 |

OTHER PUBLICATIONS

Laila Fetjah et al.; Providing QoS Mapping Rule using Data mining techniques; International Journal of Computer Science and Network Security; Dec. 1, 2007, vol. 7 No. 12, consisting of 16-pages.

Nemanja M. Ninkovic et al.; Novel Approaches to Intradomain and Interdomain Quality of Service Enhancement; 24th Telecommunications forum TELFOR 2016, IEEE; Nov. 22-23, 2016, Serbia, Belgrade, consisting of 8-pages.

Constantinos Dovrolis et al.; Dynamic class selection and class provisioning in proportional differentiated services; Computer Communications 26, Elsevier Science Publishers, Amsterdam, NL, Feb. 15, 2003, consisting of 18-pages.

DiffServ—The Scalable End-to-End Quality of Service Model; White Paper, Cisco Systems, Aug. 2005, consisting of 19-pages.

\* cited by examiner

| Traffic | Type | QoS mapping | Bandwidth (MB) | |
|---|---|---|---|---|
| T1 | Real-time Voice | EF | 1000 | Traffic Class 1 |
| T2 | Interactive Video | AF11 | 5000 | Traffic Class 2 |
| T3 | Streaming video | AF21 | 5000 | Traffic Class 3 |
| T4 | Network signaling | AF31 | | Traffic Class 4 |
| T5 | Call signaling | AF32 | 3000 | Traffic Class 4 |
| T6 | Transactional data | AF41 | | Traffic Class 5 |
| T7 | Bulk data | AF42 | 6000 | Traffic Class 5 |
| T8 | Web browsing | AF43 | | Traffic Class 5 |
| T9 | Other | BE | 4000 | Traffic Class 6 |

Fig. 4A

| Traffic | Type | QoS mapping | Bandwidth (MB) | |
|---|---|---|---|---|
| T1 | Real-time Voice | EF | 2000 | Traffic Class 1 |
| T2 | Interactive Video | AF11 | 8000 | Traffic Class 2 |
| T3 | Streaming video | AF21 | 8000 | Traffic Class 3 |
| T4 | Network signaling | AF31 | | Traffic Class 4 |
| T5 | Call signaling | AF32 | 8000 | |
| T6 | Transactional data | AF33 | | |
| T7 | Bulk data | AF42 | 4000 | Traffic Class 5 |
| T8 | Web browsing | AF43 | 4000 | |
| T9 | Other | BE | 4000 | Traffic Class 6 |

TECHNIQUE FOR SELECTING A TRANSPORT CONFIGURATION FOR A DATA NETWORK

CROSS-REFERENCE TO RELATED APPLICATIONS

This application is a Submission Under 35 U.S.C. § 371 for U.S. National Stage Patent Application of International Application Number: PCT/EP2018/080960, filed Nov. 12, 2018 entitled "TECHNIQUE FOR SELECTING A TRANSPORT CONFIGURATION FOR A DATA NETWORK," the entirety of which is incorporated herein by reference.

TECHNICAL FIELD

The present disclosure generally relates to data networks adapted to transport data traffic of different traffic types. In particular, a technique for selecting a transport configuration for such a data network is provided. The technique may be implemented in the form of a device, a method, a network system, computer program product and a cloud computing system.

BACKGROUND

Data networks such as Wide Area Networks (WANs) provide network connections between remote sites of companies and to external networks and services. WANs are multi-service networks capable of transporting different traffic types including Voice over Internet Protocol (VoIP) traffic, video-conferencing traffic, traffic generated by web applications, and media streaming traffic. Different traffic types typically have different Quality of Service (QoS) requirements in terms of latency or other QoS-related parameters. For example, a web application has less stringent latency requirements than a video-conferencing application. It is therefore a common approach to group traffic types having the same QoS requirements in a dedicated traffic class and to define a dedicated a QoS traffic handling per traffic class.

WAN operators conclude Service Level Agreements (SLAs) with WAN users to guarantee that their QoS requirements can be fulfilled. This is not an easy task since WANs may stretch through multiple network domains and utilize complex network technologies. Also, WANs have to cope with significant traffic load variations. Operating a WAN in such a manner that SLAs and QoS guarantees are not violated therefore becomes challenging when traffic loads fluctuate. Undersized WANs may lead to violations of SLAs and QoS guarantees in situations in which the traffic loads become particularly high, whereas oversized WANs will be under-utilized during most of the time.

Software Defined WAN (SD-WAN) solutions help to address such challenges by replacing traditional physical network routers and other physical network devices by virtual resources and a centralized network management approach. SD-WANs thus offer a higher flexibility when it comes to QoS/SLA management on the one hand and coping with fluctuating traffic loads on the other.

SD-WAN solutions often use predefined transport configurations derived by proper network planning. Such transport configurations may pertain to the reservation of virtual resources (e.g., in terms of bandwidth provided by virtual routers) or to the mapping of individual traffic types to individual traffic classes.

Traffic load fluctuations that follow a strict temporal pattern can easily be accommodated by implementing suitably predefined transport configurations in the same temporal pattern. There still are many situations in which the traffic load fluctuations are not exactly known in advance and can at best be predicted. In such situations, the implementation of predefined transport configurations using predefined temporal patterns may still lead to violations of SLAs or QoS guarantees and to unnecessary reservations of virtual resources.

SUMMARY

There is a need for a technique for efficiently selecting a transport configuration for a data network.

According to one aspect, a device for selecting a transport configuration for a data network adapted to transport data traffic belonging to different traffic types is provided. The device is adapted to determine an actual traffic mix of traffic types and corresponding traffic loads transported on the data network. The device is further adapted to determine, based on the actual traffic mix, multiple future traffic mixes of traffic types and corresponding traffic loads, wherein the future traffic mixes are associated with probability values and classifiable into different future traffic mix classes, wherein each future traffic mix class is associated with a predefined transport configuration capable of handling any future traffic mix falling in that future traffic mix class. The device is also configured to aggregate the probability values associated with those future traffic mixes that belong to the same future traffic mix class and to select the transport configuration associated with the highest probability value across the aggregated and non-aggregated probability values.

The device may be adapted to classify the actual traffic mix into one of multiple actual traffic mix classes. Each actual traffic mix class may be associated with a dedicated set of future traffic mixes. In such a case, the determination of the multiple future traffic mixes by the device may comprise a determination of the dedicated set of future traffic mixes associated with the determined actual traffic mix.

In one implementation, each dedicated set of future traffic mixes can be represented by a logical tree structure. The logical tree structures that correspond to multiple sets of future traffic mixes may be configured to be generated or processed by a random forest algorithm. In one example, the random forest may thus be constituted by the multiple logical tree structures, and each logical tree structure may in turn be comprised of a dedicated set of future traffic mixes. To each individual future traffic mix (as defined by one logical tree structure) an individual probability value may be assigned. Moreover, each individual future traffic mix within one logical tree structure may be mapped onto exactly one future traffic mix class. As such, each individual logical tree structure may also define an association between a specific probability value and a specific future traffic mix class per future traffic mix comprised by that logical tree structure.

Each logical tree structure may have multiple branches and each branch may represent a dedicated future traffic mix. Moreover, each branch may be associated with the particular probability value and the particular future traffic mix class corresponding to the associated future traffic mix.

Each logical tree structure may have multiple branches and each branch may be defined by a sequence of nodes arranged on different hierarchy levels. In more detail, the traffic types may be hierarchically ordered and the hierarchy levels of the nodes may reflect this hierarchical order of the traffic types. As an example, a traffic type having more stringent latency requirements may be on a higher hierarchy level (i.e., may be closer to the root of the associated logical tree structure) than a traffic type with less stringent latency requirements.

The nodes on one hierarchy level may define different changes of the traffic load of one traffic type relative to the actual traffic load of that traffic type. Those different changes may be represented by individual percentage ranges relative to the actual traffic load, or otherwise. Moreover, each node may also define a probability associated with the change represented by that node. The corresponding probabilities may dynamically be determined using at least one of measurements, simulations and a machine learning algorithm. The probability value associated with a particular future traffic mix as represented by a given branch may be obtained by multiplying the individual probabilities of the nodes constituting that particular branch.

The future traffic mix classes and the actual traffic mix classes may be defined by a single traffic mix classification system. As an example, the classification of the actual traffic mixes into different actual traffic mix classes may be performed using a K nearest neighbors algorithm as classification system. Additionally, or in the alternative, classification of the future traffic mixes into different future traffic mix classes may be performed using a K nearest neighbors algorithm as classification system.

The device may further be adapted to trigger implementation of the selected transport configuration in the data network. In general, the predefined transport configurations may pertain to a guaranteed bandwidth support by one or more network routers (i.e., per traffic type or traffic class). The network routers may be realised by virtual resources. Additionally, or in the alternative, the predefined transport configurations may pertain to a mapping of traffic types to traffic classes.

The device may further be adapted to predict, based on the actual traffic mix, if a servicing condition pertaining to at least one traffic type will be violated in the future. To this end, temporal extrapolation techniques may be applied. If no servicing condition violation is predicted, the prevailing transport configuration may be maintained. Otherwise, if a servicing condition violation is indeed expected to occur, one or more steps as described above and below to select an alternative transport configuration may be initiated, and the alternative transport configuration may be implemented. In general, the servicing condition may be defined by a threshold condition for at least one of a SLA-related parameter and a QoS-related parameter. Each transport configuration may be defined such that a given mix of traffic types and corresponding traffic loads (as defined, for example, by the traffic mix class associated with this transport configuration) does not lead to a servicing condition violation. To this end, measurements, simulations and machine learning techniques may have been performed to suitably predefine the corresponding transport configurations.

In one variant, the data network may be a Software Defined Network (SDN). The data network may in particular be an SD-WAN.

Also provided is a network system comprising a data network and a device as presented herein. In this network system, the device presented herein may be realised as part of a centralised network management component.

According to a further aspect, a method for selecting a transport configuration for a data network adapted to transport data traffic belonging to different traffic types is provided. The method comprises determining an actual traffic mix of traffic types and corresponding traffic loads transported on the data network. The method further comprises determining, based on the actual traffic mix, multiple future traffic mixes of traffic types and corresponding traffic loads, wherein the future traffic mixes are associated with probability values and classifiable into different future traffic mix classes, wherein each future traffic mix class is associated with a predefined transport configuration capable of handling any future traffic mix falling in that future traffic mix class. The method further comprises aggregating the probability values associated with those future traffic mixes that belong to the same future traffic mix class and selecting the transport configuration associated with the highest probability value across the aggregated and non-aggregated probability values.

The method may comprise further steps as described above and below. Moreover, the method may be executed by the device presented herein.

Also provided is a computer program product comprising program code portions configured to execute the method presented herein when the computer program product is executed by one or more processors. The computer program product may be stored on a computer readable recording medium or may be provided for download via a network connection.

Still further, a cloud computing system configured to execute the method presented herein is presented. The cloud computing system may be built from could computing resources.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on exemplary algorithms and exemplary algorithmic details, the present disclosure is not limited in this regard. For example, traffic mix classification will exemplarily be described using a K nearest neighbors algorithm, but other classification algorithms could be used as well. Moreover, while transport configuration selection will exemplarily be described based on a random forest algorithm, it will be readily apparent that transport configuration selection could also be performed using algorithms that are not based on logical tree structures.

Those skilled in the art will further appreciate that the steps, services and functions explained herein may be implemented using individual hardware circuits, using software functioning in conjunction with a programmed microprocessor or general purpose computer, using one or more Application Specific Integrated Circuits (ASICs) and/or using one or more Digital Signal Processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary embodiments, the same reference numerals denote the same or similar components.

Figure 1:
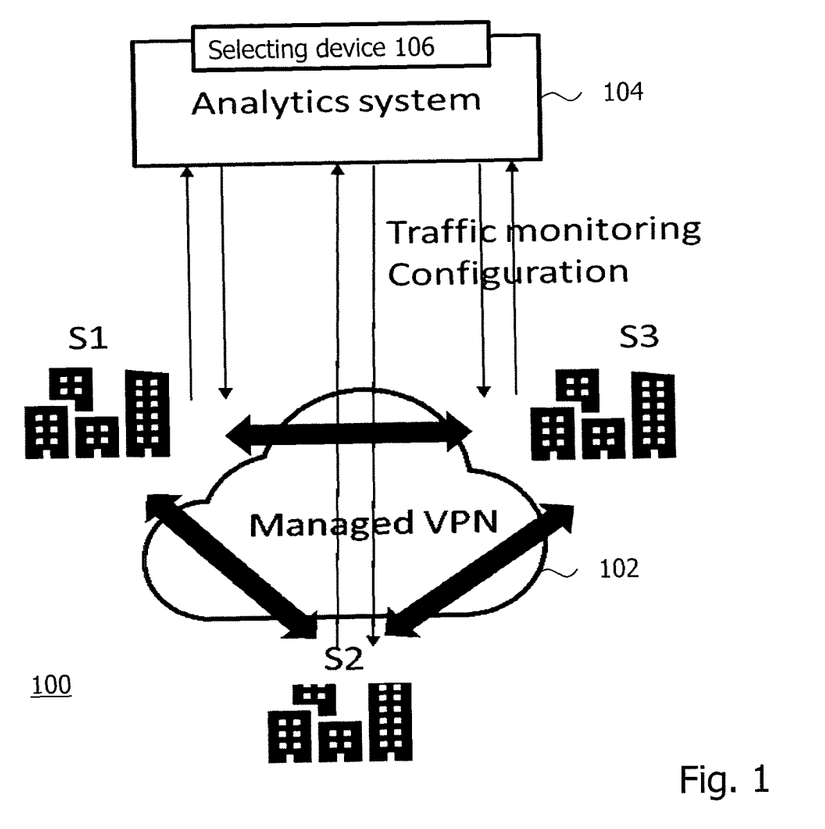
FIG. 1 is a diagram illustrating a network system embodiment of the present disclosure.

FIG. 1 illustrates an embodiment of a network system 100 in which the present disclosure can be implemented. As shown in FIG. 1, the network system 100 comprises a data network domain with one or more data networks 102 as well as a network analytics domain with a network analytics system 104.

The data network 102 comprises multiple network sites S1, S2, S3 as well as network infrastructure connecting these network sites S1, S2, S3. The data network 102 may be configured as an SDN. In particular, the data network 102 may be an SD-WAN that implements a managed Virtual Private Network (VPN).

The data network 102 is adapted to transport data belonging to different traffic types, such as VoIP traffic, video-conferencing traffic, traffic of web applications, and media streaming traffic. Those traffic types may, in turn, be classified into different traffic classes, for example according to their underlying QoS requirements. As an example, traffic types sensitive to latency, such as VoIP traffic and video-conferencing traffic, may be classified into a traffic class of higher priority, and traffic types that are less critical in terms of latency, such as traffic of web applications and media streaming traffic, may be classified in a traffic class of lower priority. It will be readily apparent that the number of traffic types and the number of traffic classes is not limited to these examples.

Returning the FIG. 1, the network analytics system 104 is configured to perform traffic monitoring in regard to the data network 102 and to select suitable transport configurations dependent thereon. The network analytics system 104 may be a centralized system capable of individually monitoring data traffic per network site S1, S2, S3 and in all traffic directions. For the purpose of selecting a suitable transport configuration dependent of the prevailing or the future network traffic situation and per network site S1, S2, S3, the network analytic system 104 comprises a selecting device 106 that will now be described in greater detail with reference to FIGS. 2A and 2B.

Figure 2A:
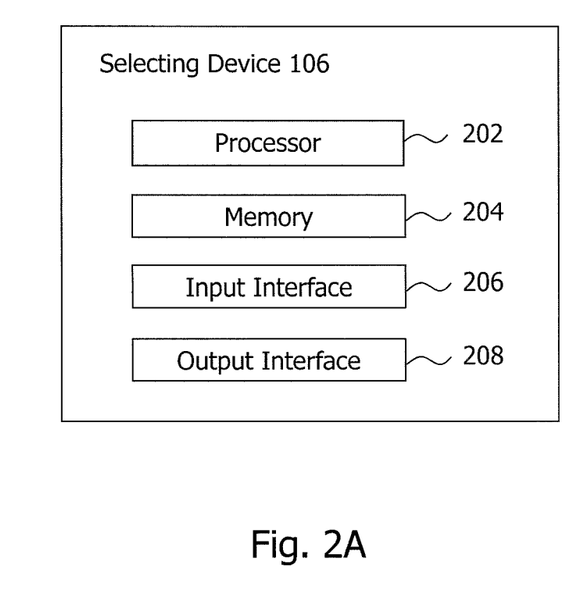
FIGS. 2A, 2B are block diagrams illustrating two selecting device embodiments of the present disclosure.

FIGS. 2A and 2B illustrate two embodiments of the selection device 106 of FIG. 1. In the embodiment illustrated in FIG. 2A, the selecting device 106 comprises a processor 202 and a memory 204 coupled to the processor 202. The selecting device 106 further comprises an optional input interface 206 and an optional output interface 208. The memory 204 stores program code that controls operation of the processor 202.

The processor 202 is configured to receive, via the input interface 206 and from the data network 102, information that permits the processor 202 to determine an actual (i.e., currently prevailing) traffic mix of traffic types and corresponding traffic loads transported on the data network 102. The processor 202 is further configured to determine, based on the actual traffic mix, multiple future traffic mixes of traffic types and corresponding traffic loads. The future traffic mixes are associated with probability values and can be classified into different future traffic mix classes. Each future traffic mix class is associated with a predefined transport configuration capable of handling any future traffic mixes falling in that future traffic mix class. The processor 202 is also configured to aggregate the probability values associated with those future traffic mixes that belong to the same future traffic mix class and to select the transport configuration associated with the highest probability value across the aggregated and non-aggregated probability values. The processor 202 outputs the selected transport configuration so that the network analytics system 104 can implement (i.e., set) the selected transport configuration in the data network 102.

Figure 2B:
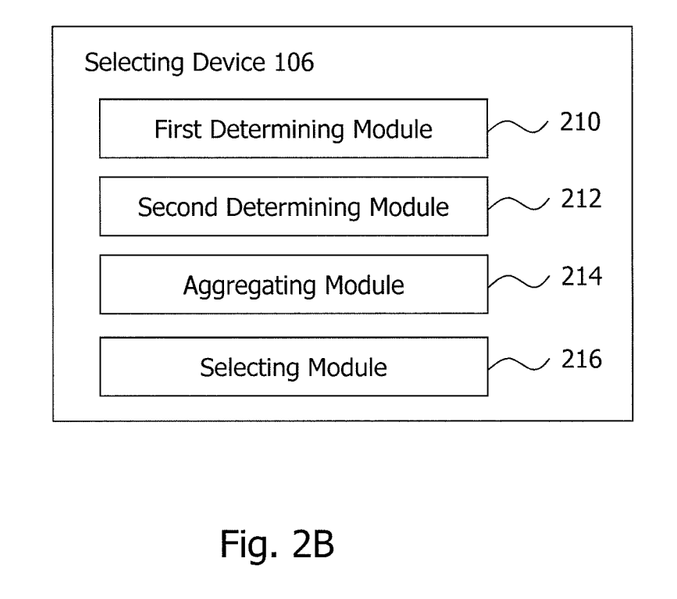

FIG. 2B shows an embodiment in which the selection device 106 is implemented in a modular configuration. As shown in FIG. 2B, the selecting device 106 comprises a first determining module 210 to determine the actual traffic mix, a second determining module 212 to determine, based on the actual traffic mix, multiple future traffic mixes, an aggregating module 214 to aggregate the probability values as described above with reference to FIG. 2A, and a selecting module 216 configured to select the transport configuration associated with the highest probability value across the aggregated and non-aggregated probability values.

Figure 3:
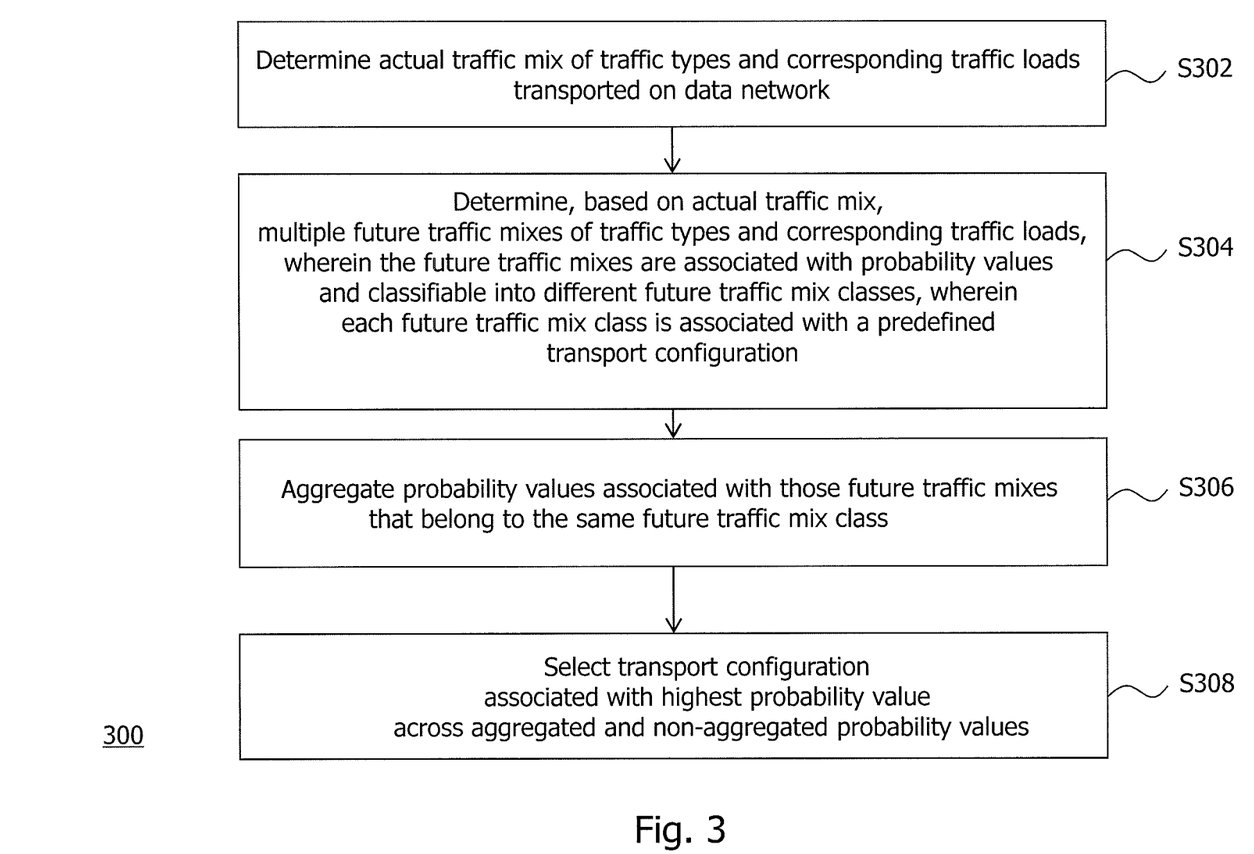
FIG. 3 is a flow diagram illustrating a first method embodiment of the present disclosure.

FIG. 3 illustrates in a flow diagram 300 a method embodiment of selecting a transport configuration for the data network 102 illustrated in FIG. 1 or any other data network. The method embodiment may be performed by any of the device embodiments of FIGS. 2A and 2B. In case the method embodiment is performed by the selecting device embodiment of FIG. 2A, the method steps will be performed by the processor 202. If the selecting device 106 is configured in accordance with the embodiment of FIG. 2B, the method steps will be performed by the corresponding modules 210 to 216.

Referring to FIG. 3, the selecting device 106 receives traffic monitoring information determined locally at the sites S1, S2, S3 of the data network 102. Based on the traffic monitoring information thus obtained, the selecting device 106 determines in step S302 an actual traffic mix of traffic types and corresponding traffic loads currently transported on the data network 102 and per site S1, S2, S3.

Figure 4A:
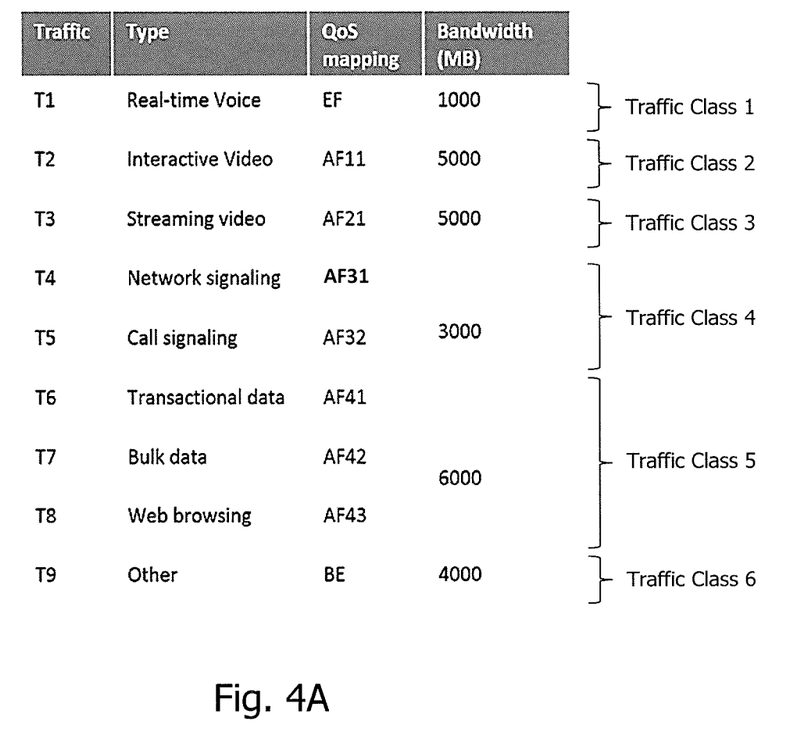
FIGS. 4A, 4B illustrate two transport configuration embodiments of the present disclosure.

In the data network 102, traffic types are mapped to traffic classes as exemplarily illustrated in the diagram of FIG. 4A. As becomes apparent from FIG. 4A, a first traffic type $T_1$ (real-time voice traffic) belongs to traffic class 1, a second traffic type $T_2$ (interactive video traffic) belongs to traffic class 2, a third traffic type $T_3$ (streaming video traffic) belongs to traffic class 3, two further traffic types $T_4$, $T_5$ (network signaling and call signaling traffic) belong to traffic class 4, and so on. The individual traffic classes, and associated traffic types, have a decreasing priority in regard to QoS handling within the data network 102 with an increasing traffic type/traffic class numbering. This means that data traffic of the traffic type $T_1$/traffic class 1 is preferentially treated within the data network 102 over data traffic belonging to second traffic type $T_2$/traffic class 2, and so on.

FIG. 4A exemplarily illustrates the DIffServ traffic class nomenclature. The first index of the AF designation indicates the traffic class and the second index indicates the packet drop priority within the traffic class. EF and BE are used to designate distinguished traffic classes, there are no further traffic classes and no drop priorities. The classes and associated drop priorities are mapped to queuing and scheduling parameters in the virtual routers of the data network 102.

The mapping of traffic types to traffic classes for QoS-related traffic handling within the data network 102 defines one transport configuration aspect for the data network 102. A further transport configuration aspect for the data network 102 illustrated in FIG. 4A is the allocation of the dedicated virtual router bandwidths to dedicated traffic types and traffic classes. As becomes apparent from FIG. 4A, a router bandwidth of 1000 MB is allocated to in traffic type $T_1$/traffic class 1, a router bandwidth of 5000 MB is allocated to traffic type $T_2$/traffic class 2, and so on. The total transport configuration for the data network 102 may comprise additional or alternative transport configuration aspects, such as the allocation of other virtual network resources.

Returning to FIG. 3, the traffic monitoring information received by the selecting device 106 comprises the actual traffic loads currently prevailing in regard to each individual traffic type and associated traffic class. As an example, the selecting device 106 may determine in step S302 and for the exemplary classification example illustrated in FIG. 4A that traffic type $T_1$ (i.e., real-time voice traffic) has a prevailing data traffic load corresponding to a utilized bandwidth of 862 MB of an associated router, whereas traffic type $T_2$ (i.e., interact video traffic) has a traffic load corresponding bandwidth utilization of 4.412 MB, and so on.

Then, in step S304, the selecting device 106 determines, based on the actual traffic mix determined in step S302, multiple future traffic mixes of traffic types and corresponding traffic loads. As an example, the actual traffic mix determined in step S302 may be classifiable into one of multiple actual traffic mix classes and each actual traffic mix class may be associated with the dedicated set of future traffic mixes. In such a case, determining the multiple future traffic mixes in step S304 may comprise a determination of the dedicated set of future traffic mixes associated with the determined actual traffic mix. In some variants, each dedicated set of future traffic mixes may be represented as a logical tree structure (e.g., as generated or processable by a random forest algorithm).

Each of the future traffic mixes is associated with a probability value that indicates the probability of its occurrence in the future. Moreover, each future traffic mix can be classified into one of different future traffic mix classes. Each future traffic mix class is, in turn, associated with a particular predefined transport configuration capable of handling any future traffic mix falling in that future traffic mix class associated with the predefined transport configuration. The predefined transport configurations may have been determined earlier based on measurements, simulations, and so on.

As explained with respect to step S304, each future traffic mix is associated with a dedicated probability value and a dedicated future traffic mix class, wherein this dedicated future traffic mix class is again associated with a predefined transport configuration. Based on these associations, the selecting device 106 aggregates in step S306 the probability values associated with those future traffic mixes that belong to the same future traffic mix class. This means that those future traffic mix classes that appear twice or more often with respect to the multiple future traffic mixes determined in step S304 will be associated with aggregated probability values obtained by mathematically adding the probability values associated with each occurrence of a particular future traffic mix class in regard of the multiple future traffic mixes determined in step S304. Evidently, no such aggregation will be performed in step S306 for future traffic mix classes that appear only once in regard of the multiple future traffic mixes determined in step S304.

Figure 4B:
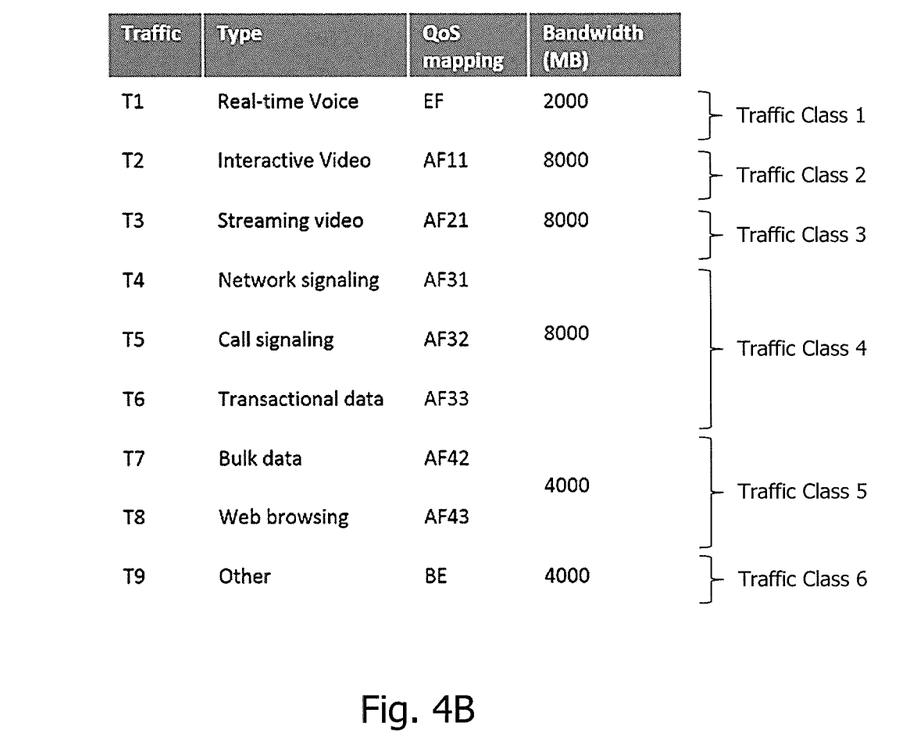

In a further step S308, the selecting device 106 individually selects for each of the sites S1, S2, S3 the dedicated transport configuration associated with the highest probability value across the aggregated and non-aggregated probability values. The selected transport configuration may, for example, have the appearance as illustrated in FIG. 4B. Compared to the transport configuration illustrated in FIG. 4A, the mapping of traffic types to traffic classes and the bandwidth allocations to individual traffic types and traffic classes have been changed. For example, a router bandwidth of 2.000 MB will now be allocated to traffic type $T_1$ (real-time voice traffic) instead of bandwidth of 1.000 MB illustrated in FIG. 4A. Moreover, traffic type $T_6$ (transactional data traffic) has now been assigned to traffic class 4 and no longer to traffic class 5, as in the transport configuration illustrated in FIG. 4A.

If in the method illustrated in FIG. 3 the aggregating step S306 was omitted, the selection step S308 would simply target at selecting the transport configuration having the highest probability value across all the future traffic mixes determined in step S304. Such a selection, however, may in certain cases yield sub-optimal selection results. Assume, for example, that a first future traffic mix class appears only once with an associated probability value of 0.2 among the future traffic mixes determined in step S304, and a second future traffic mix class appears twice with associated probability values of 0.18 and 0.17, respectively. In such a scenario, without the aggregating step S306, the selection step S308 would select the transport configuration associated with the first future traffic mix class as the first future traffic mix class has the highest overall probability value of 0.2. However, the transport configuration associated with the second future traffic mix class is more likely to yield ideal results because this transport configuration will be the best one with a likelihood of 0.18+0.17=0.35. As such, the aggregation step S306 ensures that the transport configuration that most probably yields the best overall network performance will be selected in step S308.

The benefit of classifying traffic mixes into a limited number of predefined traffic mix classes is twofold. First, one can notice and take into account that two predicted traffic mixes are close to each other, as explained in the above example. Moreover, for the limited number of traffic mix classes (and the associated limited number of transport configurations) one can have independent performance measurements (e.g., in the laboratory), and one can ensure meeting QoS and SLA requirements for the future traffic mix and the future transport configuration in this way.

In certain variants, steps S304, S306 and S308 may only conditionally be performed in case the actual traffic mix determined in step S302 is likely to result in a violation of an SLA or a QoS guarantee at a future point in time. A corresponding method embodiment will now be described in more detail with reference to flow diagram 500 of FIG. 5. Also, the application of an exemplary random forest algorithm will now be described.

Figure 5:
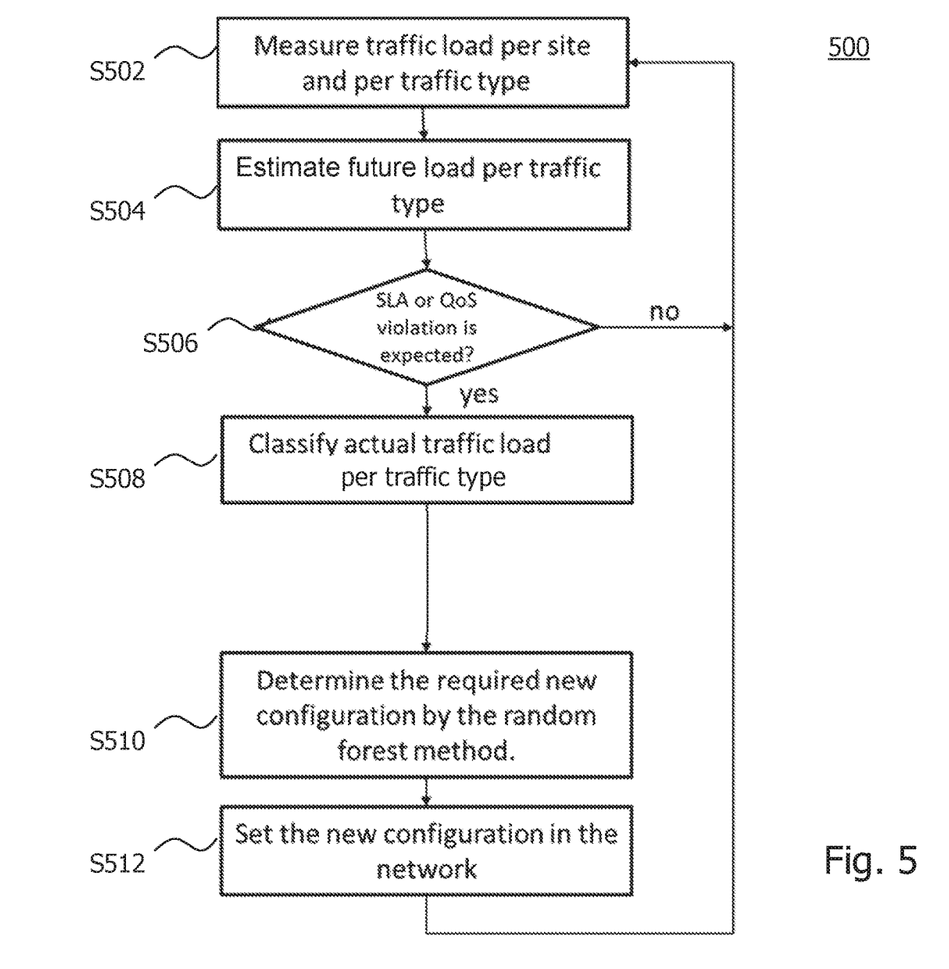
FIG. 5 is a flow diagram illustrating a further method embodiment of the present disclosure.

In a first step S502, the traffic load is measured per network site S1, S2, S3 and per traffic type. The measured traffic monitoring information is forwarded to the selecting device 106 that will determine the actual traffic mix based thereon (as generally described above with reference to step S302).

Then, in step S504, the selecting device 106 estimates, or predicts, based on the actual traffic mix, the future traffic load per traffic type with. For a given traffic type, the future traffic load is predicted in the form of multiple possible changes with respect to the actual traffic load for this traffic type. Moreover, each change for this traffic type is associated with a corresponding probability for its occurrence.

In a decision step S506, the selecting device 106 determines based on this prediction if a servicing condition pertaining to at least one traffic type will be violated in the future. The servicing condition may be defined by a threshold condition for at least one of a SLA-related parameter and a QoS-related parameter. If no violation is expected, the method loops back to step S502.

The estimation step S504 and the decision step S506 can be performed in various ways. One exemplary approach for performing steps S504 and S506 will now be described with reference to FIG. 6.

Figure 6:
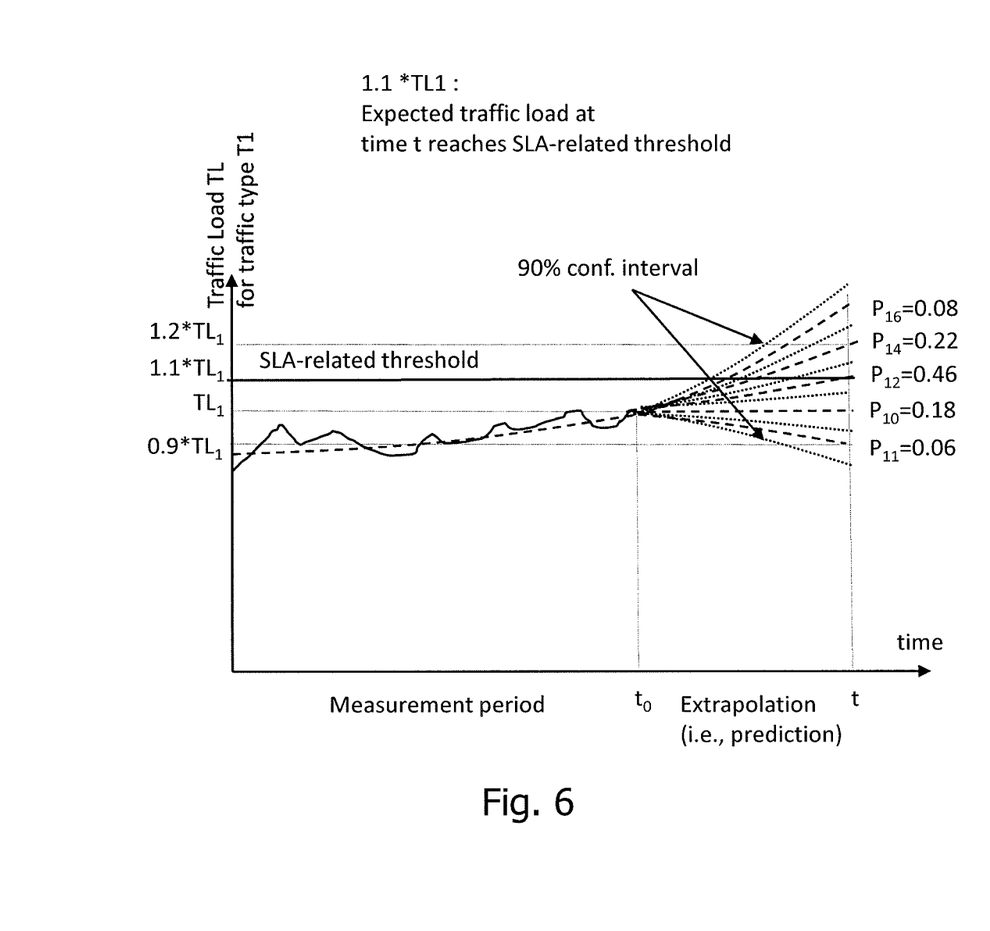
FIG. 6 is a schematic diagram illustrating an approach for predicting violation of servicing condition.

FIG. 6 illustrates an extrapolation of the traffic load associated with traffic type $T_1$ (i.e., real-time voice traffic, see FIGS. 4A and 4B) performed in the context of step S504. A similar extrapolation will be performed for all traffic types included in the actual traffic mix and for each network site S1, S2, S3. In certain variants, also traffic types currently not included in the actual traffic mix may be subjected to an extrapolation.

In more detail, FIG. 6 illustrates a traffic load measurement period with respect to traffic type $T_1$ up to the current point in time $t_0$. It is assumed that the current traffic load TL for traffic type $T_1$ at this point in time equals $TL_1$. Based on the current and historic traffic load measurements for traffic type $T_1$, an extrapolation is performed up to a future point in time t. The extrapolation may be performed by fitting a polynomic function to the traffic load in the period of time following $t_0$. In order to get a better estimate, the daily traffic profile could additionally be taken into account. It is assumed that at point in time t, the expected value of the predicted traffic load is $1.1*TL_1$.

The estimated traffic load value $1.1*TL_1$ is associated with confidence intervals belonging to different confidence levels. These confidence intervals (e.g., the load ranges around the predicted traffic values) and the associated probabilities may be determined using existing methods, such as measurements of the statistical fluctuations of the traffic load for every traffic type. By determining the kind of distribution and the magnitude of the statistic fluctuation, the probabilities associated with the individual intervals can be determined. A further method to determine the probabilities is to use machine learning algorithms. By continuously measuring the actual traffic load for each traffic type, estimating the future traffic load and comparing them later, it is possible to determine the probabilities associated with certain future traffic loads. Such an approach not only takes into account the statistical fluctuations, but also other (possibly unknown) factors.

In the present example it is assumed that the estimated traffic load value $1.1*TL_1$ reaches an SLA-related threshold at point in time t, so that an SLA violation is expected at this point in time (step 506). Therefore, a new transport configuration is required for the data network 102 and needs to be implemented before reaching the point in time t so as to avoid the imminent SLA violation. The corresponding selection mechanism for the new transport configuration will take into account the probabilities illustrated in FIG. 6 (as will be described in greater detail below).

Of course, such a violation may not only be detected for traffic type $T_1$, but also for one or more other traffic types (or only for such one or more other traffic types). It will further be appreciated that instead of or in addition to an SLA-related threshold, also a QoS-related threshold could be tested.

Figure 7:
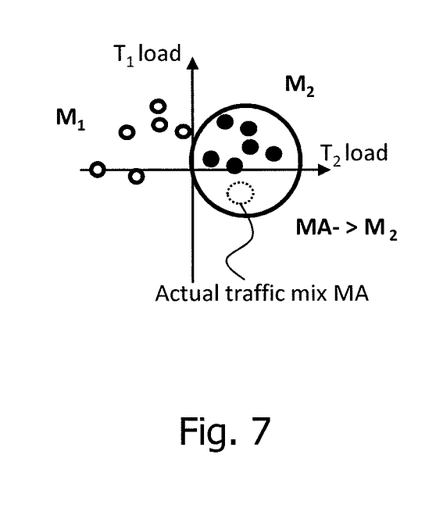
FIG. 7 is a schematic diagram illustrating application of an exemplary traffic mix classification system to a given traffic mix.

If a future SLA/QoS violation is detected in step S506, the method proceeds to step S508. In this step, the actual traffic mix is classified into one of multiple actual traffic mix classes $M_i$ (i=1 ... L). This classification may be performed using any suitable classification algorithm such as a K nearest neighbors algorithm. An exemplary classification process using a K nearest neighbors algorithm is illustrated in FIG. 7 for the case of an actual traffic mix comprising two traffic types $T_1$, $T_2$ (with associated traffic loads) and two actual traffic mix classes $M_1$ and $M_2$. The numbers of traffic types and traffic mix classes can of course be higher and can be different from each other.

In FIG. 7, the full circles define a group of predefined traffic mixes associated with actual traffic mix class $M_1$ and the empty circles define a group of predefined traffic mixes associated with actual traffic mix class $M_2$. The dotted circle represents the actual traffic mix $M_A$. Applying the K nearest neighbors algorithm, the (exemplary) actual traffic mix $M_A$ of traffic types $T_1$, $T_2$ will be classified to belong to actual traffic mix class $M_2$.

The predefined traffic mixes defining the actual traffic mix classes Mi may have been determined by measurements in the data network 102, by laboratory tests, by traffic simulations, or by a combination thereof. In some variants, each actual traffic mix class Mi is defined such that a predefined transport configuration Ci associated with this actual traffic mix class Mi is capable of handling the specific traffic mix falling into this class Mi without giving rise to any SLA or Quality of Experience (QoE) violation. The predefined transport configurations Ci may have been determined by measurements in the data network 102, by laboratory tests, by traffic simulations, or by a combination thereof.

Figure 8A:
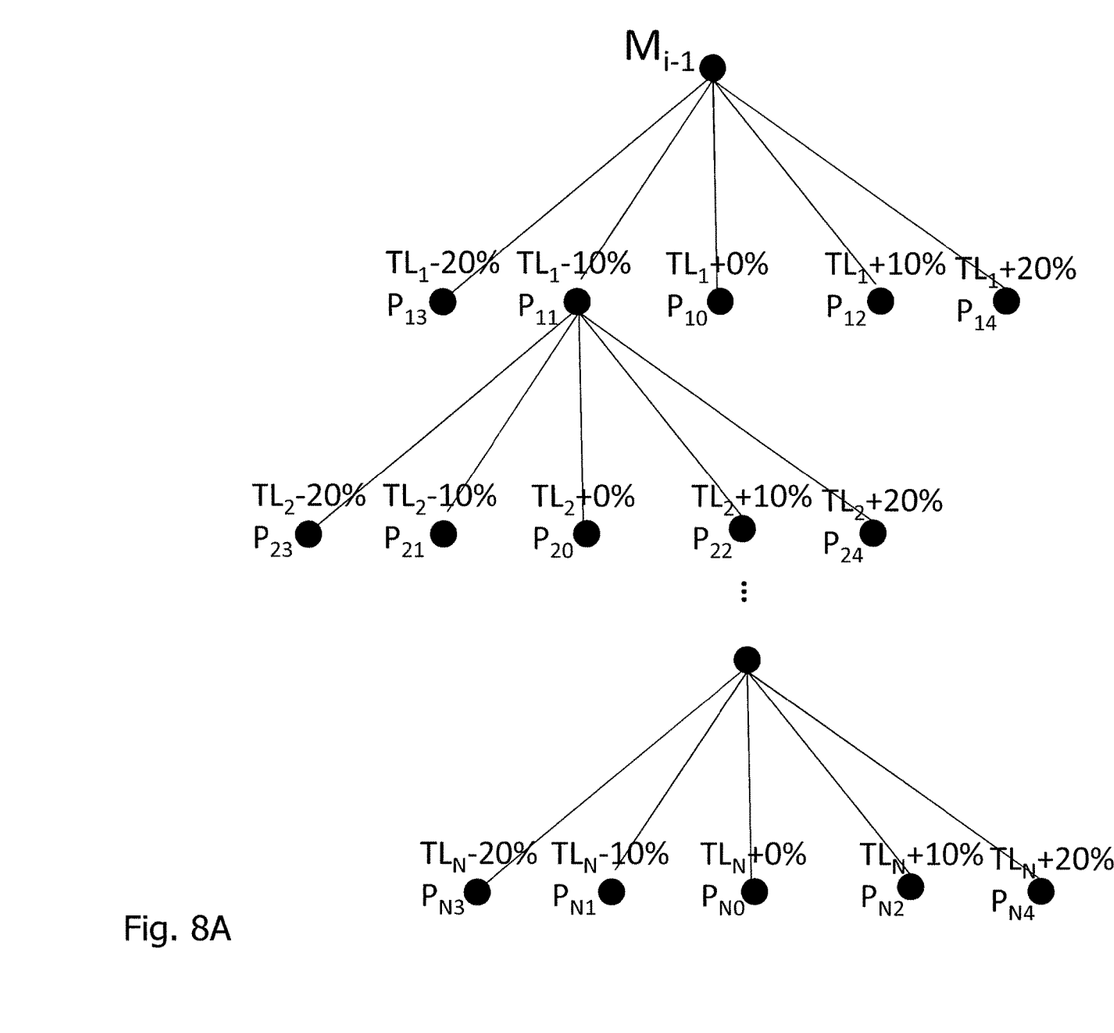
FIGS. 8A, 8B are schematic diagrams illustrating two trees of a random forest underlying an exemplary random forest algorithm.
Figure 8B:
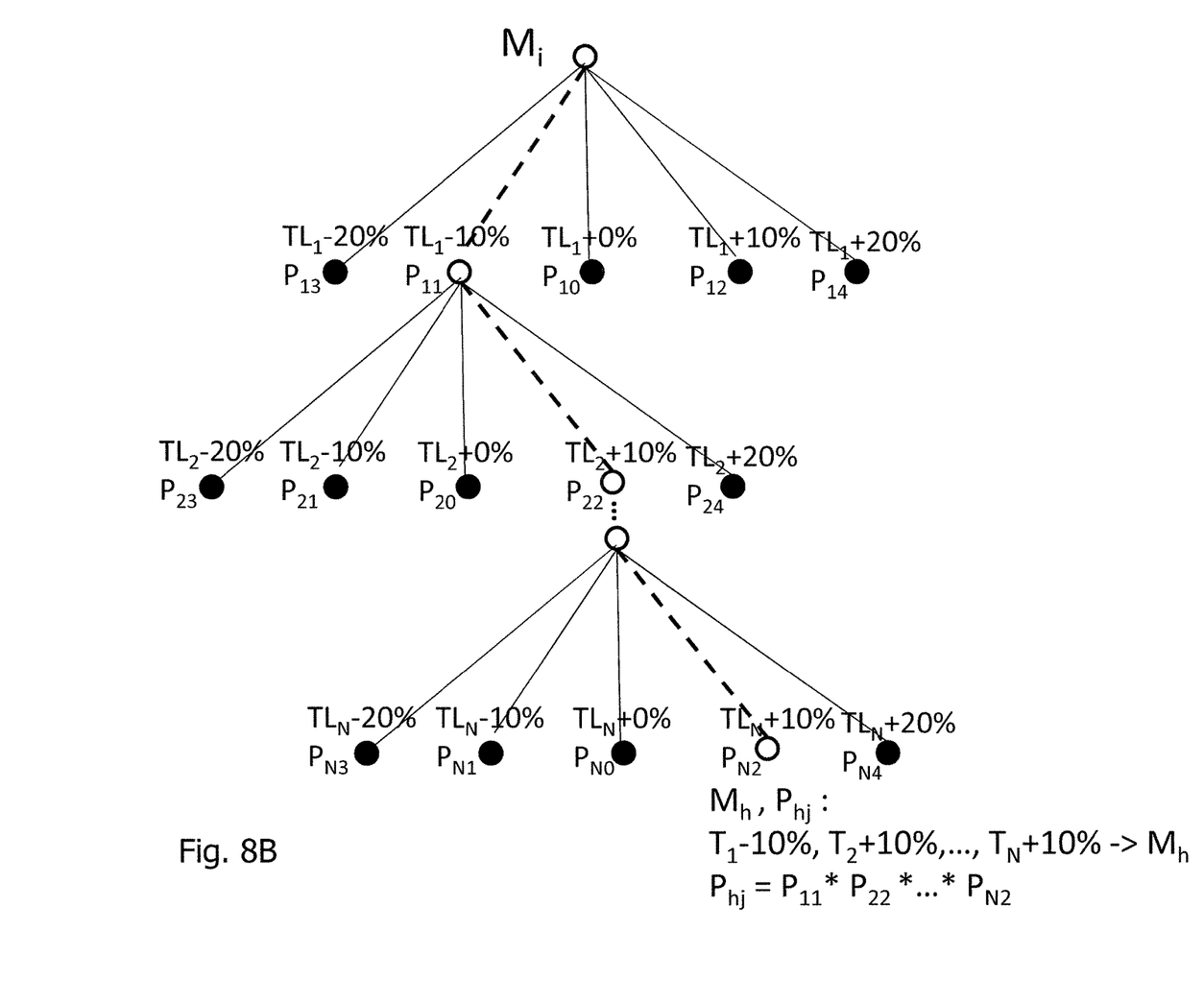

Each actual traffic mix class $M_i$ is uniquely associated with a dedicated set of future traffic mixes that span a logical tree structure (or simply "tree") of a so-called random forest as exemplarily shown in FIGS. 8A and 8B (see also step S306 in FIG. 3). FIG. 8A illustrates the "random forest tree" for actual traffic mix class $M_{i-1}$ and FIG. 8B the "random forest tree" for actual traffic mix class $M_i$. The individual tree structures and nodal parameters may be pre-stored in memory (e.g., in a database), so they can quickly be accessed when needed. There is no need to construct them on the fly, although this would also be a possibility in case sufficient processing resources are available at the selecting device 106.

As shown in FIGS. 8A and 8B, each tree has multiple branches, and each branch represents a dedicated future traffic mix of traffic types $T_1$, $T_2$, ... $T_N$ with corresponding traffic loads $TL_1$, $TL_2$, ... $TL_N$. Each branch is defined by a sequence of nodes arranged on different hierarchy levels y=1, 2, ... N, wherein each hierarchy level y corresponds to exactly one traffic type $T_y$ and the hierarchical order of the hierarchy levels y reflects the hierarchy of the traffic types $T_y$ (see also FIGS. 4A and 4B).

As illustrated in FIGS. 8A and 8B, the nodes on one hierarchy level y define different traffic load changes of the associated traffic type $T_y$ relative to the actual traffic load as determined in step S502. Each tree belongs to an actual traffic mix class at the actual point in time $t_0$. The probabilities attributed to the nodes can be different for the different trees. These probabilities are initially determined (e.g., as explained above with reference to FIG. 6) and can be updated continuously in the background. The structure of the trees for different traffic mix classes can also be different. For example starting from a dedicated traffic mix class $M_z$ (e.g., with z>3), the granularity of the branches may not be +−10% but +−5%. In another variant, +30% may not be relevant for a given traffic mix class $M_i$ and therefore this branch may be missing in the associated tree.

The probabilities associated with the nodes constituting one branch are multiplied so as to determine one probability value per branch (i.e., per future traffic mix). This is illustrated in FIG. 8B for one dedicated branch to determine the associated probability value $P_{hj}$.

Moreover, each future traffic mix as defined by a dedicated branch is subjected to a classification step to associate a dedicated future traffic mix class with each future traffic mix. This is illustrated in FIG. 8B for one dedicated branch to determine the associated future traffic mix class $M_h$.

It will in the following—without loss of generality—be assumed that the same classification system as discussed above with reference to classification of the actual traffic mix and FIG. 7 will be used (i.e., the K nearest neighbors algorithm). As such, each future traffic mix (and each branch) will be associated with exactly one future traffic mix class $M_i$. For the reasons explained above, each future traffic mix class $M_i$ will further be uniquely associated with a dedicated transport configuration $C_i$ (see also step S306 in FIG. 3). It has been found that the classification system used in step S508 is generally also suitable for use in step S510. However, in some cases different classification systems may be used in these two steps.

So when a SLA/QoS degradation is predicted in step S506, the selecting device 106 will continue and may determine the actual traffic mix class $M_4$ (without loss of generality) in step S508 and then apply a random forest approach (step S510) to identify the required new transport configuration $C_4$ that permits to avoid the SLA/QoE violation predicted earlier in step S506. To this end, the tree belonging to the actual traffic mix class $M_4$ will be selected first (see FIG. 9) and read from memory. Then, this selected tree may be updated based on the latest priorities as determined in step S504. In a further step, the probability values and future traffic mix classes will be determined for all possible future traffic mixes represented by the selected tree (as exemplarily illustrated in FIG. 8B for $P_{hj}$ and $M_h$).

Figure 9:
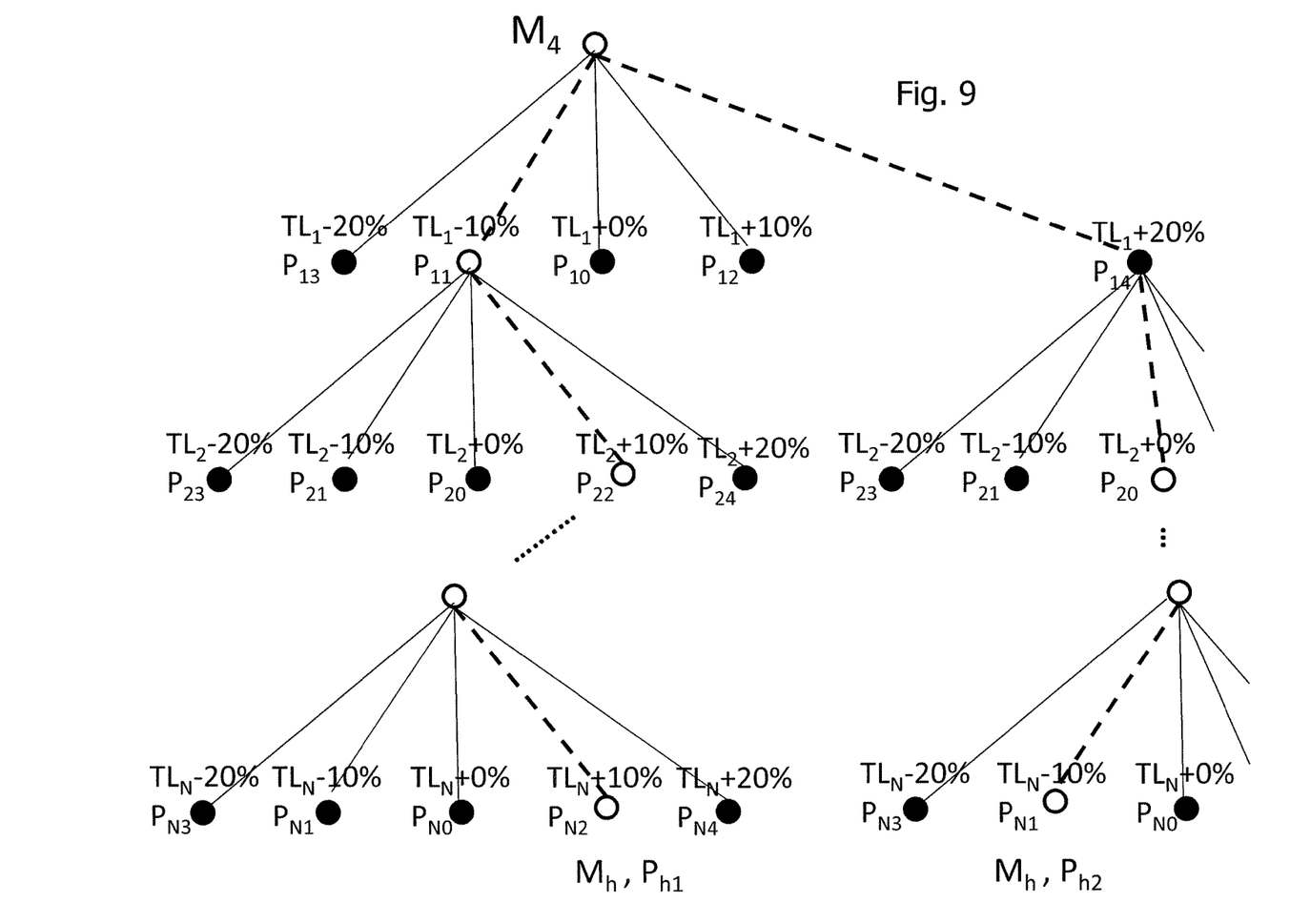
FIG. 9 illustrates an exemplary logical tree structure underlying the random forest of FIGS. 8A, 8B.

Further, the probability values associated with those future traffic mixes that belong to the same future traffic mix class will be aggregated (see also step S306 in FIG. 3). FIG. 9 illustrates the exemplary case in which future traffic mix class $M_h$ appears twice (or more often) in the tree associated with actual traffic mix class $M_4$. The aggregation step for each future traffic mix class $M_h$ over all j occurrences of this traffic mix class with the respective probability values $P_{hj}$ can thus be expressed as:

$$M_h: P_h = \text{SUM}_j(P_{hj})$$

Of course, no such aggregation can be performed for future traffic mix classes $M_h$ that appear only once in the tree of interest. Once the aggregation has been performed, the future traffic mix class $M_{new}$ associated with the highest probability values across the aggregated and non-aggregated probability values will be determined and the transport configuration $C_{new}$ associated with this future traffic mix class $M_{new}$ will be selected (see also step S308 in FIG. 3):

$$\text{Max } [P_h] \rightarrow M_{new} \rightarrow C_{new}$$

The selected transport configuration $C_{new}$ is suitable to avoid a future SLA/QoS violation for the "most probable" future traffic mix class $M_{new}$. As such, the risk of such a future SLA/QoS violation can be minimized. Moreover, the aggregation approach across all branches of the tree of interest avoids the situation that the transport configuration $C_i$ associated with the single branch to which the highest non-aggregated probability value is assigned will necessarily be selected, since such selection may increase the risk of a future SLA/QoS violation compared to the situation in which an aggregation occurs. Of course, there may still exist situations in which despite the aggregation approach the transport configuration $C_i$ associated with the single branch to which the highest non-aggregated probability value is assigned will be selected.

In a further step S512, the selected transport configuration $C_{new}$ is implemented, or set, in the data network 102. As explained above, a separate transport configuration $C_{new}$ can be selected and implemented per network site S1, S2, S3. The selecting device 106 may trigger a Dynamic Orchestration (DO) or Network Management (NM) system co-located with or integrated in the network analytic system 104 to perform the necessary processes. As explained with reference to FIGS. 4A and 4B above, these processes may include the implementation of a new mapping between traffic types and traffic classes (assuming that the data network 102 applies a traffic class-based QoS handling mechanism). Additionally, or in the alternative, the router bandwidth allocations may be changed.

As has become apparent from the above description of exemplary embodiments, the technique presented herein prevents in a reliable manner the violation of SLAs and QoS requirements in data networks. The technique is not only capable of reacting to rapid traffic load changes across all traffic types, but also permits to react in case the traffic load of individual traffic types changes faster than that of other traffic types. Therefore, the technique is capable of taking into account variations within traffic mixes even if the total traffic load across all traffic types substantially remains constant. Moreover, the classification into a limited number of traffic mix classes (and associated predefined transport configurations) significantly facilitates the procedure as a whole since the required number of measurements, simulations, etc. can be decreased. Also, the uncertainties of traffic prediction can easily be accommodated. In sum, a significant over-dimensioning of network resources can be avoided while still ensuring given QoS and SLA targets.

It will be appreciated that the present disclosure has been described with reference to exemplary embodiments that may be varied in many aspects. As such, the present invention is only limited by the claims that follow.

The invention claimed is:

1. A device for selecting a transport configuration for a data network adapted to transport data traffic belonging to different traffic types, the device being configured to:
    determine a traffic mix of N traffic types and one traffic load per traffic type transported on the data network, N being an integer greater than 1;
    determine, based on the traffic mix, multiple future traffic mixes of the N traffic types and one traffic load change per traffic type, each traffic load change being attributed a probability value for each future traffic mix, an associated future traffic mix class being determined and each future traffic mix class being uniquely associated with a dedicated transport configuration capable of handling any future traffic mix falling in that future traffic mix class;

aggregate the probability values associated with those future traffic mixes that belong to the same future traffic mix class;

select the dedicated transport configuration uniquely associated with a highest one of the probability values across the aggregated probability values and one or more non-aggregated probability values as the transport configuration for the data network; and classify the traffic mix into one of multiple traffic mix classes, each traffic mix class associated with a dedicated set of future traffic mixes and each dedicated set of future traffic mixes representable by a logical tree structure.

2. The device of claim 1, wherein determining the multiple future traffic mixes comprises a determination of the dedicated set of future traffic mixes associated with the determined traffic mix.

3. The device of claim 1, wherein the logical tree structures that correspond to different sets of future traffic mixes are configured to be one of generated and processed by a random forest algorithm.

4. The device of claim 1, wherein each logical tree structure has multiple branches and each branch represents a dedicated future traffic mix.

5. The device of claim 1, wherein each logical tree structure has multiple branches and each branch is defined by a sequence of nodes arranged on different hierarchy levels.

6. The device of claim 5, wherein the traffic types are hierarchically ordered and the hierarchy levels of the nodes reflect the hierarchical order of the traffic types.

7. The device of claim 5, wherein the nodes on one hierarchy level define:
the traffic load changes of one traffic type relative to the actual traffic load of that traffic type; and
the probabilities attributed to the traffic load changes.

8. The device of claim 7, wherein the probabilities are dynamically determined using at least one of measurements, simulations and a machine learning algorithm.

9. The device of claim 7, configured to, in the aggregating operation, multiply the probabilities associated with the nodes of each individual branch to determine a probability value associated with a future traffic mix represented by that branch.

10. The device of claim 1, wherein the future traffic mix classes and the traffic mix classes are defined by a single traffic mix classification system.

11. The device of claim 1, configured to classify the traffic mixes into different traffic mix classes using a K nearest neighbors algorithm.

12. The device of claim 1, configured to classify the future traffic mixes into different future traffic mix classes using a K nearest neighbors algorithm.

13. The device of claim 1, configured to trigger implementation of the selected transport configuration ($C_i$) in the data network.

14. The device of claim 1, wherein
the predefined transport configurations ($C_i$) pertain to at least one of:
guaranteed bandwidth support by one or more network routers; and
mapping of traffic types to traffic classes.

15. The device of claim 1, configured to:
predict, based on the actual traffic mix, if a servicing condition pertaining to at least one traffic type will be violated in the future; and
maintain a prevailing transport configuration if no servicing condition violation is predicted.

16. A network system, comprising:
a data network; and
a device for selecting a transport configuration for a data network adapted to transport data traffic belonging to different traffic types the device being configured to:
determine a traffic mix of N traffic types and one traffic load per traffic type transported on the data network, N being an integer greater than 1;
determine, based on the traffic mix, multiple future traffic mixes of the N traffic types and one traffic load change per traffic type, each traffic load change being attributed a probability value for each future traffic mix, an associated future traffic mix class being determined and each future traffic mix class being uniquely associated with a dedicated transport configuration capable of handling any future traffic mix falling in that future traffic mix class;
aggregate the probability values associated with those future traffic mixes that belong to the same future traffic mix class;
select the dedicated transport configuration uniquely associated with a highest one of the probability values across the aggregated probability values and one or more non-aggregated probability values as the transport configuration for the data network; and
classify the traffic mix into one of multiple traffic mix classes, each traffic mix class associated with a dedicated set of future traffic mixes and each dedicated set of future traffic mixes representable by a logical tree structure.

17. A method for selecting a transport configuration for a data network adapted to transport data traffic belonging to different traffic types, the method comprising:
determining a traffic mix of N traffic types and one traffic load per traffic type transported on the data network, N being an integer greater than 1;
determining, based on the traffic mix, multiple future traffic mixes of the N traffic types and one traffic load change per traffic type, each traffic load change being attributed a probability value for each future traffic mix, an associated future traffic mix class being determined and each future traffic mix class being uniquely associated with a dedicated transport configuration capable of handling any future traffic mix falling in that future traffic mix class;
aggregating the probability values associated with those future traffic mixes that belong to the same future traffic mix class;
selecting the dedicated transport configuration uniquely associated with a highest one of the probability values across the aggregated probability values and one or more non-aggregated probability values as the transport configuration for the data network; and
classifying the traffic mix into one of multiple traffic mix classes, each traffic mix class associated with a dedicated set of future traffic mixes and each dedicated set of future traffic mixes representable by a logical tree structure.

18. The method of claim 17, wherein the method is performed by a cloud computing system.

\* \* \* \* \*